United States Patent [19]

Landoll

[11] 4,352,916
[45] Oct. 5, 1982

[54] USE OF HYDROPHOBICALLY MODIFIED WATER SOLUBLE POLYMERS IN SUSPENSION POLYMERIZATION

[75] Inventor: Leo M. Landoll, Wilmington, Del.

[73] Assignee: Hercules Incorporated, Wilmington, Del.

[21] Appl. No.: 284,271

[22] Filed: Jul. 17, 1981

[51] Int. Cl.³ .............................................. C08F 2/00
[52] U.S. Cl. ..................................... 526/200; 526/201; 526/202; 526/344.2; 526/329.2; 526/329.7; 526/346; 526/336
[58] Field of Search ..................... 526/200, 201, 202

[56] References Cited

U.S. PATENT DOCUMENTS

| 4,228,277 | 10/1980 | Landoll | 536/90 |
| 4,248,754 | 2/1981 | Fox et al. | 260/29.6 E |
| 4,252,697 | 2/1981 | Hashizume et al. | 260/17 A |
| 4,304,902 | 12/1981 | Landoll | 528/419 |

Primary Examiner—Joseph L. Schofer
Assistant Examiner—Bernard Lipman
Attorney, Agent, or Firm—William S. Alexander

[57] ABSTRACT

Use of hydrophobically modified nonionic cellulose ethers or ethylene oxide copolymers leads to improved particle size and less latex formation in suspension polymerization processes. Cellulose ethers are modified with a small amount of long chain ($C_6$–$C_{25}$) alkyl radical. Ethylene oxide copolymer is ethylene oxide copolymerized with $C_6$ to $C_{24}$ epoxide.

4 Claims, No Drawings

USE OF HYDROPHOBICALLY MODIFIED WATER SOLUBLE POLYMERS IN SUSPENSION POLYMERIZATION

This invention relates to the suspension polymerization (also known as granular, bead, or pearl polymerization due to the shape of the resultant polymer particles) art. More specifically, it relates to the use of certain hydrophobically modified water soluble polymers as stabilizers to improve the performance of such a polymerization.

Many commercially important polymers, such as polystyrene, poly(methyl methacrylate), poly(vinyl chloride), poly(vinyl acetate), and copolymers such as acrylonitrilebutadiene-styrene, styrene-butylmethacrylate, styrene-divinyl benzene, styrene-diethylaminoethyl methacrylate, and copolymers of vinyl chloride with acrylic or methacrylic acid esters are produced by suspension polymerization. In this process, droplets of monomer or monomer mixture containing dissolved catalyst are dispersed in water and each droplet polymerizes independently to form a discrete particle of polymer.

As the suspension polymerization proceeds, the monomer droplets progress from the liquid state through a viscous, sticky, polymer-monomer mixture to rigid, spherical polymer particles. A major problem in this process is to prevent coalescence of the particles as the product passes through the viscous, sticky, polymer-monomer mixture stage. This can be accomplished by the use of certain stabilizers. Materials which have been used heretofore as suspension polymerization stabilizers have mostly been water soluble polymers such as gelatin, pectin, starch, methyl cellulose, CMC, hydroxyethyl cellulose, acrylic or methacrylic acid polymers and copolymers, poly(vinyl alcohol) and poly (vinylpyrollidone); or inorganic powders such as kaolin, talc, magnesium silicate, magnesium carbonate, barium sulfate, aluminum hydroxide, tri-calcium phosphate, and calcium oxalate.

While most of the conventional stabilizers work well as stabilizers, they are not totally satisfactory because the particle size of the resultant polymer beads is not easily controlled. To control the particle size, the stabilizer is usually used in combination with small amounts of strong surface active agent such as a wetting agent or a soap of the type employed in well known emulsion polymerization procedures.

The use of currently known stabilizers results in some emulsion polymer being formed simultaneously with formation of suspension polymer. An excess of emulsion polymer formation can lead to fouling of the reactor and, of course, reduces the yield of the desired suspension polymer. Moreover, control of particle size requires careful manipulation of agitation rate and combinations of stabilizers and, even then, control has heretofore been possible only over a very narrow particle size range with any given stabilizer system.

It is the object of this invention to provide a method of conducting a suspension polymerization wherein good control of particle size is effected without formation of objectionable amounts of emulsion polymer.

Another object of the invention is to provide a new stabilization system for suspension polymerization procedures.

In accordance with this invention there is provided a method of conducting a suspension polymerization which comprises carrying out said polymerization in the presence of about 0.05 to 5% by weight, based on monomer to be polymerized, of a hydrophobically modified water-soluble polymer selected from the class consisting of (a) nonionic cellulose ethers modified by the addition thereto of a long chain alkyl substituent of 6 to about 25 carbon atoms and (b) a copolymer of ethylene oxide and about 0.2 to 4% by weight of a $C_6$ to $C_{24}$ epoxide comonomer.

The polymers useful as stabilizers according to this invention are well known water-soluble polymers which have been modified by incorporating long chain n-alkyl radicals into them to alter the rheological properties of their solutions. The polymers remain water-soluble but they exhibit substantially greater viscosifying power and somewhat increased surface activity than do the unmodified materials.

The modified nonionic cellulose ether is water-soluble methyl cellulose, hydroxyethyl cellulose, or hydroxypropyl cellulose further substituted with $C_6$ to $C_{25}$ alkyl radical in an amount between about 0.2 weight percent and that amount which renders it less than 1% soluble in water. The long chain alkyl radical can be attached via either an ether or ester linkage, but the ether linkage is preferred as it is more stable in aqueous environment. A more complete discussion of these products and their preparation can be found in U.S. Pat. No. 4,228,227.

The modified methyl cellulose has D.S. of at least about 1.4 and preferably about 1.7 to 2.5 moles of methyl substituent per average anhydroglucose unit (i.e., 1.7 to 2.5 hydroxy group per AHG unit are substituted). The hydrophobe is present at about 0.2 to 2%.

The modified hydroxyethyl cellulose has a hydroxyethyl M.S. of at least about 1.5 and preferably about 1.5 to 4.0 (i.e. about 1.5 to 4.0 moles of hydroxyethyl substitution per average anhydroglucose unit) and relatively low to medium molecular weight. The amount of hydrophobe can vary from about 0.2 to about 4% by weight; above which point it begins to develop insolubility.

The modified hydroxypropyl cellulose has hydroxypropyl M.S. of about 2 to 5 and about 1.5 to 1.75% hydrophobe by weight.

The ethylene oxide copolymer is described in U.S. Pat. No. 218,158 of Landoll, assigned to the assignee of the instant application. This material is prepared by copolymerizing ethylene oxide and a $C_6$ to $C_{24}$ n-1,2-epoxide. The amount of hydrophobe can vary from about 0.2 to 4% by weight.

Any of the commonly known vinyl monomers can be successfully suspension polymerized or copolymerized using the stabilizer of this invention. This includes, e.g., vinyl chloride, vinylidene chloride, styrene, vinyl toluene, methyl methacrylate, vinyl acetate, acrylonitrile, diethylaminoethyl methacrylate, sodium acrylate and sodium methacrylate.

Polymerization is effected substantially as heretofore known in the art with exception of using the novel stabilizer of this invention. A monomer or a mixture of monomers is dispersed by strong mechanical agitation into droplets which are thereby suspended in an aqueous liquid phase in a ratio of about 1:1 to 1:4 (monomer:aqueous) by weight. Both the monomer and the resulting polymer are normally essentially insoluble in the aqueous suspending medium, but when the monomer and the resulting polymers are soluble in water, electrolytes can be added to salt-out the monomers and the polymers. Most monomers used in suspension polymerization are liquids at room temperature, but gaseous and solid monomers can also be readily polymerized by this process.

Polymerization catalysts or initiators are usually dissolved in monomer. Catalysts used in suspension polymerization are essentially the same as those used for solution and bulk polymerization of vinyl monomers. These include organic peroxides and azo compounds, e.g., benzoyl peroxide, lauroyl peroxide, 2-ethylhexyl peroxydicarbonate, alpha-cumyl peroxydecanoate, azobisisobutyronitrile, azobis-gamma, gamma-dimethylvaleronitrite.

Propeller or paddle-type mechanical agitation is usually used in suspension polymerization. In general, higher speed of agitation gives finer beads. Bead size is also dependent upon the concentration and nature of suspending agents, temperature, catalyst concentration and aqueous to monomer ratio. Reactor geometry and the type of agitator also affect particle size.

Polymerization temperature varies over a bit range depending upon the catalyst system employed. Generally, suspension polymerization is carried out at temperatures below the boiling points of the monomers and water. However, temperatures above the boiling points of monomer and water can be employed using high pressure kettles. Reflux cooling can also be used.

After completion of polymerization, polymer beads and aqueous phase are separated by filtration. Water soluble polymeric stabilizers can also be removed by washing the beads with water.

Using the technique of the invention, it is possible to prepare fairly uniform polymer particles within the range of about 10 microns to about 5 mm (number average particle diameter). Variation of particle size depends to a great extent upon the concentration of the stabiizer employed. As stabilizer concentration is increased, particle size decreases. Stabilizer concentration required is between about 0.05 and 5% and preferably between about 0.05 and 1.5%.

The invention is illustrated in the following examples, wherein parts and percentages are by weight unless otherwise indicated.

EXAMPLE 1

A series of polymerization runs with styrene monomer were carried out using as a stabilizer different concentrations of a 2.5 M.S. hydroxyethyl cellulose modified with about 2.5% of a $C_{14}$ n-alkyl hydrophobe.

The required amount of stabilizer was dissolved in enough water to make a total of 79.8 parts of solution. This solution was charged to a small reactor which was then sealed and sparged with $N_2$ for thirty minutes. Temperature of the reactor was increased to about 70° C. with constant temperature water.

Twenty-five (25) parts styrene monomer and 0.2 part azobisisobutyronitrile (AIBN) initiator were mixed and sparged with $N_2$ in an ice bath for about thirty minutes. With the stabilizer solution at 70° C., the monomer-initiator mixture was charged to the reactor in one charge. Polymerization was conducted over a 5 hour period under continuous agitation.

At the end of five (5) hours, agitation was stopped and polymer particles allowed to settle for about 24 hours, at which time the supernatant water layer was removed by aspiration. The water layer was then centrifuged at 1800 RPM. The top aqueous phase containing fine particles was considered latex. A sample was evaporated at 70° C. under aspiration vacuum to determine the amount of latex solids present.

EXAMPLE 2

A second series of polymerizations was carried with methyl methacrylate (MMA) monomer. Otherwise the procedure, apparatus and catalyst were identical with Example 1.

Data concerning Examples 1 and 2 are recorded in Table 1.

TABLE 1

| Example # | Monomer | Stabilizer Conc. (%)* | % Polymer in latex | Number Average Particle Diameter (Microns) |
|---|---|---|---|---|
| 1(a) | Styrene | 0.25 | <1 | 206 |
| 1(b) | Styrene | 0.50 | <1 | 85 |
| 1(c) | Styrene | 0.75 | <1 | 87 |
| 1(d) | Styrene | 1.00 | <1 | 109 |
| 1-Control** | Styrene | 0.5 | 5.4 | 115 |
| 1-Control** | Styrene | 1.5 | 8.4 | 110 |
| 2(a) | MMA | 0.75 | <1 | — |
| 2(b) | MMA | 1.00 | <1 | — |
| 2-Control | MMA | 1.00 | 9.1 | — |
| 2-Control | MMA | 1.50 | 9.8 | — |

*% based on weight of monomer.
**All controls used hydroxyethyl cellulose of 2.5 M.S. as stabilizer.

EXAMPLE 3

Styrene polymerization runs were conducted on a larger scale in a jacketed reactor fitted with a variable speed agitator. The following reactor recipe was used:
(a) Styrene monomer—25 parts
(b) Initiator—0.3 parts
(c) Aqueous phase—74.7 parts (includes $H_2O$ and stabilizer)

Varying amounts of hydroxyethyl cellulose modified with 1.0 by weight of a $C_{16}$ alkyl radical were dissolved in sufficient water to make up a total of 74.7 parts. This was charged to the reactor and the pH was adjusted to 3.5 with phosphoric acid, then sparged with $N_2$ for one half hour.

Concurrently, the initiator was dissolved in the monomer and likewise sparged with nitrogen.

Temperature in the reactor was increased to 80° C. and the monomer-initiator solution was charged to the reactor with continuous agitation at 500 RPM. Polymerization was continued for twelve hours.

Polymer recovery and workup were effected as described in Example 1.

EXAMPLE 4

Following the procedure of Example 3, another series of styrene polymerizations were carried out, using as stabilizer, a copolymer of ethylene oxide and $C_{20}$ to $C_{24}$ n-alkyl epoxide.

Results of Example 3 and 4 are recorded in Table 2.

TABLE 2

| Ex # | Stabilizer Conc.*** | Yield % | % Polymer in Latex | Number Average Particle Diameter (Microns) |
|---|---|---|---|---|
| 3(a) | 0.1 | 100 | <1 | 1320 |
| 3(b) | 0.2 | 96 | <1 | 1561 |
| 3(c) | 0.3 | 97 | <1 | 911 |
| 3(d) | 0.4 | 95 | <1 | 135 |

TABLE 2-continued

| Ex # | Stabilizer Conc.*** | Yield % | % Polymer in Latex | Number Average Particle Diameter (Microns) |
|---|---|---|---|---|
| 4(a)* | 0.1 | 99 | <1 | 2000 |
| 4(b) | 0.2 | 99 | <1 | 888 |
| 4(c)* | 0.1 | 98 | <1 | 2380 |
| 4(d) | 0.2 | 98 | <1 | 372 |
| 4(e)* | 0.1 | 98 | <1 | 811 |
| 4(f) | 0.2 | 98 | <1 | 464 |
| Control** | 0.1 | 0 | dispersion destabilized during polymerization. | |

*4(a) & 4(b) stabilizer contained 0.23% $C_{20}$–$C_{24}$ epoxide 4(c) & 4(d) stabilizer contained 0.53% $C_{20}$–$C_{24}$ epoxide 4(e) & 4(f) stabilizer contained 0.71% $C_{20}$–$C_{24}$ epoxide
**Control stabilizer is poly(ethylene oxide) homopolymer of $4 \times 10^5$ M.W.
***% based on monomer

EXAMPLE 5

A series of vinyl chloride polymerizations were carried out in a stirred autoclave. The polymerization mixture was a mixture of 150 parts vinyl chloride and 300 parts aqueous phase ($H_2O$+stabilizer). The stabilizer employed was hydroxyethyl cellulose modified with 1.0% of $C_{16}$ alkyl group.

The stabilizer solution was charged to the autoclave and sparged with $N_2$, with agitation for about one half hour. Meanwhile an initiator solution in vinyl chloride monomer was charged to a separate sealed cylinder, sparged with nitrogen for about one half hour, then transferred to the reactor. Reactor temperature was raised to the polymerization temperature—about 52° C.—and reaction carried out for about ten hours. The product was worked up as described in earlier examples.

Results are recorded in Table 3.

EXAMPLE 6

The procedure of Example 3 was repeated to prepare styrene copolymer. Results are shown in Table 4.

TABLE 4

| Ex # | Comonomer | Conc. | Catalyst Conc.* | Yield % | % Polymer in Latex | Number Average Particle Size (Microns) |
|---|---|---|---|---|---|---|
| 6(a) | butyl methacrylate | 35% | 1.25** | 98 | <1 | 245 |
| 6(b) | divinyl benzene | 4 | 0.6*** | 99 | <1 | 578 |

*Parts catalyst/100 parts monomer mixture
**Benzoyl peroxide
***AIBN

What I claim and desire to protect by Letters Patent is:

1. In a process wherein at least one vinyl monomer is polymerized by dissolving a polymerization initiator in said vinyl monomer, suspending the resultant solution in water containing a suspension stabilizer and subjecting the suspension to polymerization conditions, the improvement which comprises the suspension stabilizer being selected from the class consisting of
    (a) a water-soluble, nonionic cellulose ether modified with a $C_6$ to $C_{25}$ alkyl radical in an amount between about 0.2% by weight and an amount sufficient to render said ether less than 1% soluble in water; and
    (b) a copolymer of ethylene oxide and about 0.2 to 4% by weight of a $C_6$ to $C_{24}$ alkyl epoxide.
2. The process of claim 1 wherein the vinyl monomer is selected from styrene, methyl methacrylate, vinyl chloride, diethylamino ethyl methacrylate and butyl methacrylate.
3. The process of claim 2 wherein the stabilizer is modified hydroxyethyl cellulose having hydroxyethyl M.S. between about 1.5 and 3.5 and substituted with about 0.2 to 4% by weight of $C_6$ to $C_{25}$ alkyl radical.
4. The process of claim 2 wherein the stabilizer is ethylene oxide copolymer.

* * * * *

TABLE 3

| Ex # | Stabilizer* Conc. | Catalyst | Catalyst** Conc. | Polymer Yield % | % Particle in Latex | Number Average Diameter (Microns) |
|---|---|---|---|---|---|---|
| 5(a) | 0.13 | 2-ethyl peroxy dicarbonate | 0.1 | 60 | <1 | 108 |
| 5(b) | 0.07 | alpha-cumyl peroxydecanoate | 0.1 | 70 | <1 | 103 |
| 5(c) | 0.14 | alpha-cumyl peroxydecanoate | 0.1 | 65 | <1 | 144 |

*% based on monmer
**Parts catalyst/100 parts monomer mixture